(No Model.) 3 Sheets—Sheet 2.
G. A. MELIN.
VELOCIPEDE.
No. 422,089. Patented Feb. 25, 1890.
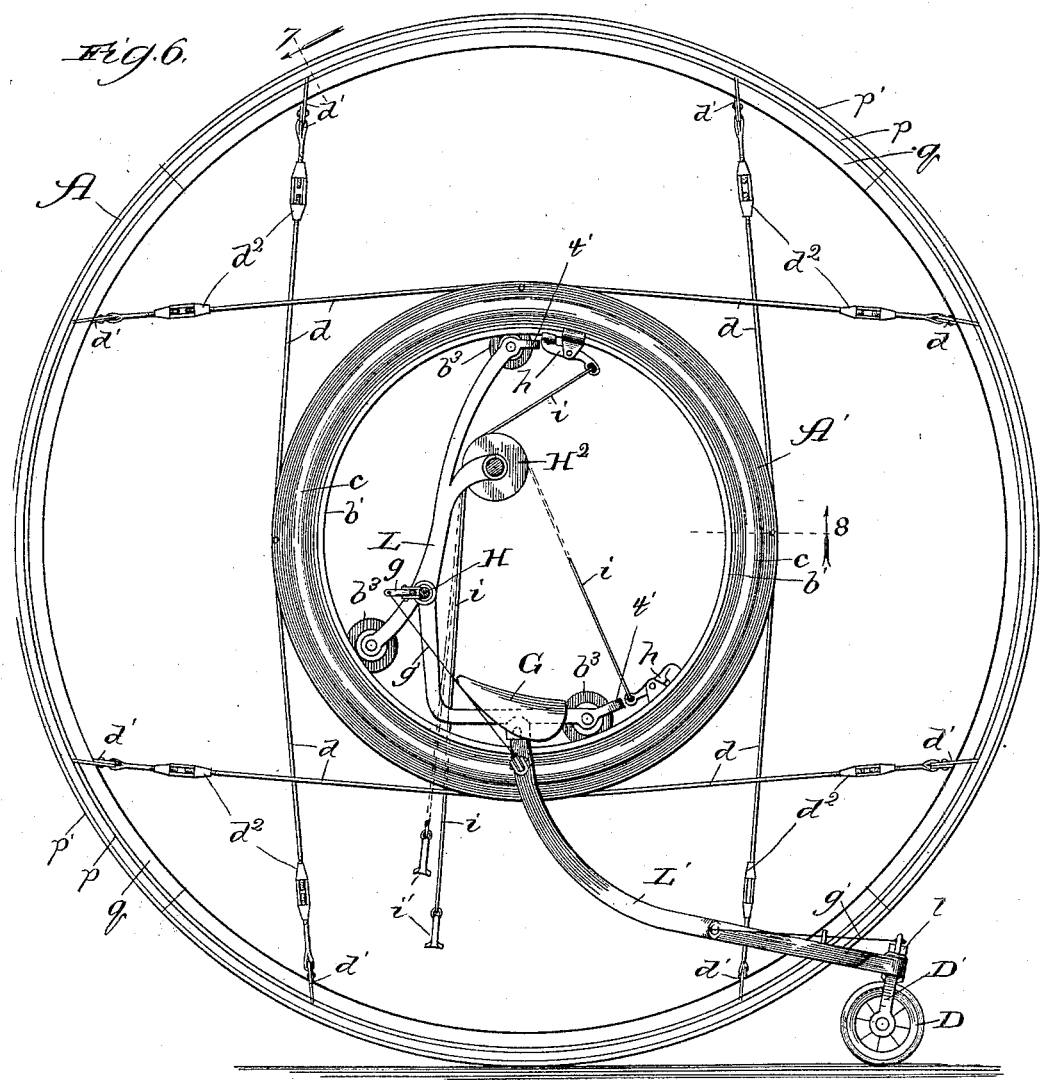
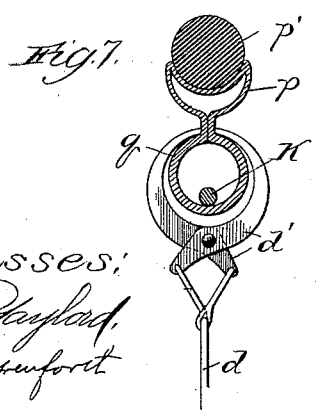
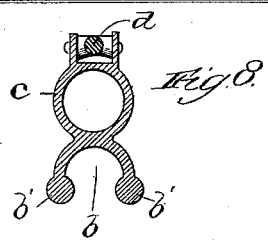
Witnesses:
Inventor:
Gustaf A. Melin,
By Dyrenforth & Dyrenforth
Attys (No Model.) 3 Sheets—Sheet 3.
G. A. MELIN.
VELOCIPEDE.
No. 422,089. Patented Feb. 25, 1890.
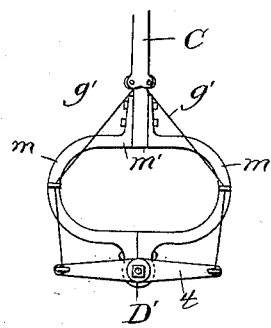
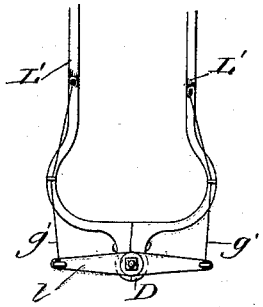
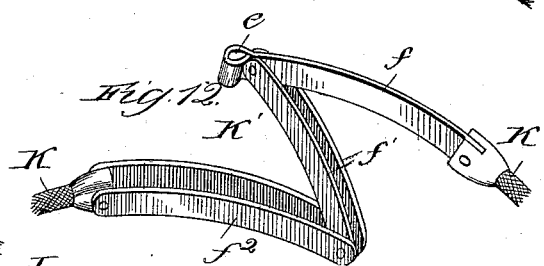
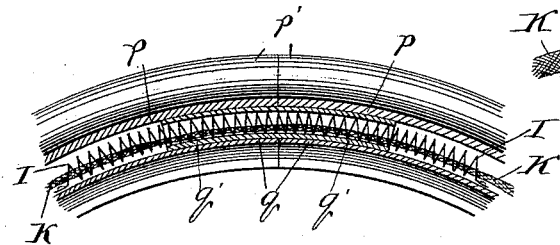
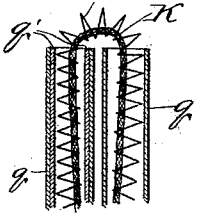
Witnesses:
Chas E Gaylord,
J. R. Dyrenforth
Inventor:
Gustaf A. Melin,
By Dyrenforth & Dyrenforth,
Attys.

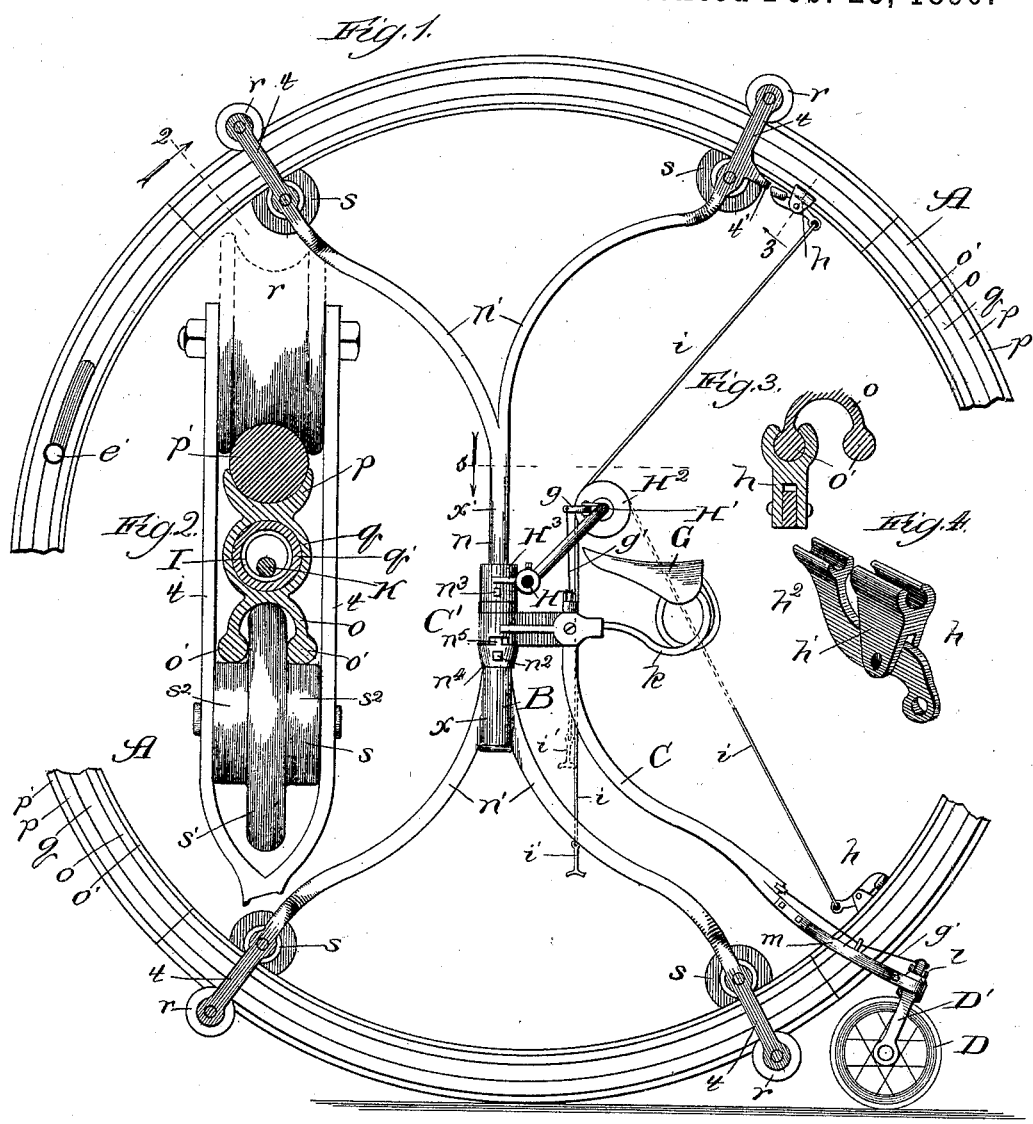

UNITED STATES PATENT OFFICE.

GUSTAF A. MELIN, OF CHICAGO, ILLINOIS.

VELOCIPEDE.

SPECIFICATION forming part of Letters Patent No. 422,089, dated February 25, 1890.

Application filed September 30, 1889. Serial No. 325,580. (No model.)

*To all whom it may concern:*

Be it known that I, GUSTAF A. MELIN, a citizen of the United States, residing at Chicago, in the county of Cook and State of Illinois, have invented a new and useful Improvement in Velocipedes, of which the following is a specification.

The objects of my improvement are, first, to provide a velocipede having a main wheel the diameter of which may within reasonable limits be indefinitely greater than has been possible to provide in velocipedes as hitherto constructed, whereby travel over rough roads and the overriding of obstacles may be rendered more easy than hitherto; second, to provide such a velocipede the construction of which shall obviate what is termed a "header," and, third, to provide such a velocipede which shall be capable of being folded into a comparatively small compass for transportation and storage.

While certain of my improvements are applicable to velocipedes of any number of wheels, I prefer to employ them in bicycles, and the drawings therefore illustrate a bicycle embodying my improvements.

Figure 1 is a section taken on the line 1 of Fig. 5, showing the main part of my improved bicycle in elevation; Fig. 2, an enlarged broken section taken on the line 2 of Fig. 1 and viewed in the direction of the arrow; Fig. 3, an enlarged broken section taken on the line 3 of Fig. 1 and viewed in the direction of the arrow; Fig. 4, a perspective view of one of the clutches; Fig. 5, a section taken on the line 5 of Fig. 1 and showing details in top plan view; Fig. 6, a view in elevation, partly sectional, of a modified construction of my improvement; Figs. 7 and 8, enlarged sections taken on the lines 7 and 8, respectively, of Fig. 6 and viewed in the directions indicated; Fig. 9, an enlarged broken plan view of a detail of the construction shown in Fig. 1; Fig. 10, a similar view of the corresponding detail shown in Fig. 6; Figs. 11 and 12, enlarged broken perspective views of details; Fig. 13, a broken sectional view of the main wheel; and Fig. 14, a similar view of the same, illustrating it as folded.

The bicycle shown in Fig. 1, and which is the preferred construction, comprises, broadly stated, a main wheel A in the form of an annulus without spokes; a main frame B within the wheel having bifurcated ends $t$, provided each with a set of rollers $s\ r$, which bear, respectively, against the inner and outer peripheries of the wheel A; an auxiliary frame C, secured to the frame B, carrying a seat for the operator and extending at one end beyond and in rear of the wheel A, where it is provided with a small wheel or follower D, and propelling and steering mechanisms, both hereinafter fully described.

The wheel A comprises an annular metal tube $q$, provided on its outer periphery with a concave rim $p$, in which extends a rubber tire $p'$, which is adjusted around the wheel in the manner hitherto common in velocipedes. Extending entirely around the inner periphery of the tube $q$ is a concave projection $o$, affording a guide for parts hereinafter described, and having the edges of its sides enlarged into circular heads, which afford endless tracks or guides $o'$.

The frame B is of metal, and shaped preferably as shown, with a straight tubular central portion $n$ in two sections $x$ and $x'$ and four tubular arms $n'$. The periphery of each roller $s$ has a narrow central projecting portion $s'$, with shoulders $s^2$ on opposite sides, and the rollers are journaled in the bifurcated ends $t$, to extend with their parts $s'$ between and their shoulders against the tracks $o'$. The rollers $r$ have concave peripheries to fit the tire $p'$, and they are journaled in the ends $t$ so as to bear against and roll upon the tire. The wheel A is thus held firmly to the frame, while the rollers enable it to revolve without material interference.

The frame C is formed toward its lower end with a loop or eye $m$, oblong in cross-section, as shown, through which the wheel A revolves. The upper end of the frame C forms a collar $C'$, which extends loosely around the part $n$ of the frame B and rests upon an enlargement $n^4$ of the latter, which affords a seat. Projecting upward from the shoulders is a lug or stop $n^5$, and the collar $C'$ has an elongated socket, into which the stop $n^5$ extends. The stop $n^5$ is movable in the elongated groove, which gives to the frames B and C independent play within limits which enable the wheel A to be oscillated toward but not quite to the opposite sides of the loop $m$. Beyond the loop $m$ the frame C affords a bearing for a pivotal support D', which is bifurcated below the frame, affording journals for the wheel D, which rotates between the forks, and the support D' is provided above the frame with a cross-piece $l$. The seat G for the operator is mounted upon a spring $k$, secured to the frame, as shown.

H is a cross-bar, bent preferably to the shape shown in Fig. 5. At its center it extends through and is rigid with a collar $H^3$, which surrounds the part $n$ of the frame B, and is held rigidly in place by a set-screw $n^3$. From the collar $H^3$ the cross-bar projects upward and backward to opposite sides of the seat G, where it affords handles H'. The cross-bar H is provided toward its opposite extremities with loose pulleys $H^2$.

The propelling mechanism comprises cords $i$, provided at one end with clutches $h$ and at their opposite ends with stirrups $i'$. The clutches $h$ are preferably of the form shown in Fig. 4, comprising each a body portion $h'$ and lever $h^2$. In the face of each body portion $h'$ is a segmental groove to receive and embrace a guide or track $o'$, to which it is inseparably attached and upon which it slides freely. Each lever portion $h^2$ is provided at one end with a groove to fit the face of a track $o'$, and toward its opposite end it is secured to an end of the cord $i$. A clutch is mounted and movable upon each track $o'$, and the cords extend over the pulleys $H^2$, respectively, to cause the stirrups $i'$ to hang below opposite sides of the seat. The rider sits upon the seat G with a foot in each stirrup $i'$. The clutches $h$ tend, when released, to assume by force of gravity the lowest position on the guides $o'$, which is down against a stop $m'$, afforded by the inner side of the loop $m$ of the frame C. A pull upon a cord $i$ causes the clutch to which it is attached to grip the guide. The pulleys $H^2$ being above and back of the center of the wheel, the point of the latter nearest the pulleys is at about the upper rear arm $t$. As the rider presses downward upon a stirrup $i'$ the cord $i$ draws upon the clutch, causing it to grip the wheel and turn the latter until the part thereof gripped by the clutch reaches the point nearest the pulleys. Upon the rear upper arm $t$ is a stop $t'$, against which the clutch strikes, and, the stirrup at that instant being raised by the rider's foot, the clutch slides down to its initial position, while the inertia of the wheel moves it forward. The stirrups are forced down alternately, so that one clutch ascends as the other descends, and the force exerted against the wheel to revolve it is thus rendered continuous. The stirrups may be raised or lowered on the cords $i$, so that they are easily adjusted to accommodate themselves to the rider.

The slight lateral movement of which the frame C is capable independent of the frame B, and which enables the wheel A to be oscillated toward the opposite sides of the loop $m$, as before stated, affords facilities for changing the direction of the bicycle, though of course only in a comparatively large radius. To enable the device to be turned more quickly, therefore, I provide steering mechanism, which consists of hand-levers $g$ in the form of bell-crank levers upon the handles H', from an end of which cords $g'$ extend, as shown in Fig. 5, down into the tubular frame C, and out of the latter at the loop $m$ to the opposite ends of the cross-piece $l$, to which they are secured. Pressure upon one of the hand-levers $g$ forces it toward the respective handle H', and, drawing upon the cord $g'$, to which it is attached, turns the follower-wheel D, while equal pressure upon both hand-levers operates to maintain the follower-wheel steady.

The rider sitting within the wheel is enabled to propel the latter with comparatively little exertion and without danger of a header, because it is impossible for the frame E to overturn.

This device being necessarily very large, it would be difficult to transport or store it in the condition in which it is shown in Fig. 1, and I therefore construct the frame portion in detachable sections and the wheel in folding sections.

The lower portion $x$ of the part $n$ of the frame B is of larger diameter than the upper part $x'$ and permits the latter to telescope into it, the parts being held together by a nut-bolt $n^2$, which may be passed through both parts when they are in relatively operative position. The collar $H^3$ may be slid along the frame by loosening the set-screw $n^3$, and the rollers $r$ are rendered detachable. Therefore to remove the frame A from the wheel the rollers $r$ are taken out of the bifurcated ends $t$ and the bolt $n^2$ out of the part $n$. The upper portion $x'$ of the part $n$ is then slid down in the lower portion thereof until the ends $t$ clear the wheel. The sides of the loop $m$ are secured in place by bolts, as shown in Fig. 9, which, on being removed, enable the frame C to be separated from the wheel.

The wheel A is divided, preferably, into quadrants, which abut against each other with great exactness in forming the wheel. Within the tube $q$, and fitting the latter snugly but loosely, are short sections $q'$ of metal tubing, affording tenons to stiffen the joints of the quadrants. Extending inside the tubes $q$ and $q'$, across the joints, are helical springs I, which are secured at opposite ends to the inner side of the tube $q$ far enough beyond the ends of the tenons $q'$ to permit the latter to be slid, in one direction at least, away from the joints. K is a thong or cord of flexible but inelastic material, which extends around the wheel within the tube $q$, tenons, and springs. The opposite ends of the thong K are joined by a tightener K', also within the tube $q$, which latter has an elongated opening in one side at the location of the tightener. The tightener comprises three pivotal arms $f\ f'\ f^2$, which fit one within the other, as shown in Fig. 11. Opening the arms apart, as shown in Fig. 12, elongates the tightener, while closing them together shortens it. The thong K operates to hold the wheel together, and when the tightener is shortened, as shown in Figs. 1 and 11, the thong is drawn taut. The end of the arm $f$ is provided at its end where it joins the arm $f'$ with an eye $e$, through which a thumb-screw $e'$ is passed to engage a threaded socket in the opposite side of the tube $q$, whereby the tightener is held firmly down. To fold the wheel A, the arms $f\ f'$ of the tightener are swung out through the opening in the tube and the thong thus loosened. This enables the quadrants to be separated against the resistance of the springs I and the tenons to be slid along the tube. The quadrants are then folded over against each other, as shown in Fig. 14, the springs I operating as hinges, which prevent their separation.

The modified construction of the bicycle shown in Figs. 6, 7, 8, and 10 comprises a wheel A substantially like that described in the preferred construction, but without the guides $o\ o'$. A′ is an inner wheel secured in the outer wheel by rods $d$, arranged as shown, secured to the periphery of the wheel A′, and connected at their opposite ends with the tube $q$ by means of tongs $d'$. Adjacent to the tongs on each rod $d$ is a turn-buckle $d^2$, whereby the rods may be drawn taut and the inner wheel A′ rendered firm. The inner wheel comprises a tube $c$, provided on its inner periphery with a concave guide $b$, (corresponding with the before-described guide $o$,) which has its edges formed into heads to afford tracks or guides $b'$, (corresponding with the tracks or guides $o'$ in the preferred construction.) Within the wheel A′ is a frame L, shaped preferably as shown, and provided at its ends with rollers $b^3$, which are similar to the rollers $s$, before described, and fit snugly into and run in the guides $b$. The propelling mechanism is substantially the same as in the preferred construction, comprising cords $i$, which extend over pulleys H$^2$, mounted upon arms which extend laterally of the frame L to place them at opposite sides of the rider. The cords $i$ carry stirrups $i'$ and clutches $h$, which engage and slide upon the guides $b'$, all as in the other construction. Tubular bars L′, integral with or rigidly secured to the frame L, extend downward and backward therefrom beyond the wheel, where they converge into contact and are bolted together, as shown in Fig. 10. The follower-wheel D of this device is also journaled in a pivotal support D′, mounted toward the end of the bars L′, where they join, and a cross-bar $l$ upon the support above the bars L′ is connected with the cords $g'$ of the steering mechanism, which is substantially the same as that of the preferred construction, the cords extending through the tubular bars L′. The seat G is rigid upon the frame L, and sitting upon it the upper part of the rider's body is within the wheel A′, while his legs hang down on opposite sides. The wheel A may be folded, as before described, but the wheel A′ remains intact.

By leaving off the bars L′ and follower-wheel the device shown as the modified construction may be used as a single-wheel velocipede. The weight of the rider upon the seat would serve to maintain the frame L upright, and the steering of the device would be effected by movement by the rider of his body to one side or the other.

What I claim as new, and desire to secure by Letters Patent, is—

1. In a velocipede, the combination of a main wheel formed in folding sections and a non-rotary seat for the rider, and propelling mechanism to be operated by the feet of the rider, supported within the circumference of the main wheel, substantially as described.

2. In a velocipede, the combination of a main frame, a seat for the rider upon the main frame, and a main wheel detachably mounted on the main frame to surround the seat, and independently revoluble, and formed in folding sections, substantially as described.

3. In a bicycle, the combination of a main frame, a seat for the rider upon the main frame, a main wheel detachably mounted on the main frame to surround the seat, and independently revoluble, and formed in folding sections, an auxiliary frame secured to the main frame and extending beyond the main wheel, a rotary follower-wheel secured to the auxiliary frame beyond the main wheel, and propelling mechanism, substantially as described, operated by the feet of the rider and imparting rotary movement to the main wheel, substantially as set forth.

4. In a velocipede, the combination of a frame, a seat for the rider upon the frame, a wheel surrounding the seat, mounted on the frame, and independently revoluble, pulleys on opposite sides of the frame toward one side of the wheel, and propelling mechanism comprising flexible strands $i$, each provided toward one end with a stirrup $i'$ and toward its opposite end with a clutch to engage the inner periphery of the wheel, substantially as described.

5. In a velocipede, the combination of a frame, a seat for the rider upon the frame, a wheel surrounding the seat, mounted on the frame, and independently revoluble, comprising a tube $q$, outer concave projections $p$, tire $p'$, and inner concave projection $o$, affording guides $o'$, and propelling mechanism, substantially as described, operated by the feet of the rider and engaging with the guides $o'$ to impart rotary movement to the wheel, substantially as set forth.

6. In a velocipede, the combination of a frame having arms $n'$, provided with bifurcated ends $t$, an independently revoluble wheel surrounding the seat and extending through the bifurcated ends of the frame, and comprising a tube $q$, outer concave projection $p$, tire $p'$, and inner concave guide $o$, a concave roller $r$, journaled in each end $t$ and bearing against the tire $p'$, a convex roller $s$, journaled in each end $t$ and bearing against the guide $o$, and propelling mechanism, substantially as described, operated by the feet of the rider and imparting rotary movement to the wheel, substantially as set forth.

7. In a velocipede, a folding wheel A, comprising a tube $q$ and integral outer concave projection $p$, divided into abutting segmental sections, a tire $p'$, extending around the projection $p$, sliding tenons $q'$, and springs I within the tube $q$, at the junction of the segments thereof, and a strand K, of flexible material, extending around the wheel within the tube and having its ends secured together by a tightener K', substantially as described.

8. In a velocipede, the combination of a folding wheel A, a detachable frame for the wheel, comprising telescoping sections provided with arms $n'$, having bifurcated ends $t$, rollers $s$, journaled in the ends $t$ to engage the inner periphery of the wheel, and detachable rollers $r$, also journaled in the ends $t$ to engage the outer periphery of the wheel, substantially as described.

GUSTAF A. MELIN.

In presence of—
   J. W. DYRENFORTH,
   M. J. FROST.